(12) United States Patent
Kollman et al.

(10) Patent No.: US 8,783,143 B2
(45) Date of Patent: Jul. 22, 2014

(54) BLIND CUTTING MACHINE

(75) Inventors: Michael Kollman, Fitchburg, WI (US); Adam Ward, Portland, OR (US)

(73) Assignee: Lumino, Inc., Madison, WI (US)

( * ) Notice: Subject to any disclaimer, the term of this patent is extended or adjusted under 35 U.S.C. 154(b) by 1811 days.

(21) Appl. No.: 11/999,136

(22) Filed: Dec. 4, 2007

(65) Prior Publication Data

US 2008/0087152 A1 Apr. 17, 2008

Related U.S. Application Data

(63) Continuation-in-part of application No. 11/035,604, filed on Jan. 14, 2005.

(51) Int. Cl.
| | |
|---|---|
| *B26D 7/06* | (2006.01) |
| *B26D 5/30* | (2006.01) |
| *B26D 7/02* | (2006.01) |
| *B23D 23/00* | (2006.01) |
| *E06B 9/266* | (2006.01) |
| *B23D 33/10* | (2006.01) |

(52) U.S. Cl.
CPC ............... *B23D 23/00* (2013.01); *B23D 33/10* (2013.01); *E06B 9/266* (2013.01)
USPC ................. 83/76.1; 83/167; 83/452

(58) Field of Classification Search
USPC .......... 83/76.9, 167, 100, 452, 256, 199, 622, 83/694, 513, 519, 621, 604, 169, 659, 200, 83/196; 29/24.5
See application file for complete search history.

(56) References Cited

U.S. PATENT DOCUMENTS

| | | | |
|---|---|---|---|
| 5,333,365 A | 8/1994 | Marocco et al. | |
| 5,418,729 A * | 5/1995 | Holmes et al. | ................. 700/167 |
| 5,799,557 A | 9/1998 | Wang | |
| 5,806,394 A | 9/1998 | Marocco | |
| 6,003,218 A * | 12/1999 | Schumann et al. | ............ 29/24.5 |
| 6,196,099 B1 | 3/2001 | Marocco | |
| 6,240,824 B1 | 6/2001 | Hsu | |
| 6,412,381 B1 | 7/2002 | Wang et al. | |
| 6,427,571 B1 | 8/2002 | Hsu | |
| 6,615,698 B2 | 9/2003 | Chuang et al. | |
| 6,945,152 B2 | 9/2005 | Jabbari et al. | |
| 7,171,738 B2 * | 2/2007 | Dick et al. | ....................... 29/563 |
| 7,255,031 B2 | 8/2007 | Nien et al. | |
| 2003/0213348 A1 * | 11/2003 | Roberts et al. | .................. 83/197 |
| 2004/0149104 A1 | 8/2004 | Jabbari et al. | |

* cited by examiner

*Primary Examiner* — Ghassem Alie
(74) *Attorney, Agent, or Firm* — Buchanan Ingersoll & Rooney PC

(57) ABSTRACT

A cutting machine for trimming window covering work pieces is disclosed. The cutting machine includes a stand, one or more cutting mechanisms attached to the stand, a controller and one or more locators connected to the controller that are movable relative to the one or more cutting machines and are configured to engage at least a portion of a window covering work piece between the ends of the work piece. The controller has a memory having a program. The program enables the controller to cause one or more of the locators to move so that a desired amount of material can be trimmed from at least one end of the work piece after the controller receives information about the work piece. The controller may be connected to the one or more locators by one or more wireless connections or by one or more direct connectors such electronic wiring.

27 Claims, 11 Drawing Sheets

Locator 96 is connected to a controller 95, the locator 96 is moved by at least one actuator, the at least one actuator may be connected to the controller 95 by a direct connection or a wireless connection

BLIND CUTTING MACHINE

CROSS REFERENCE TO RELATED APPLICATION

This is a continuation-in-part patent application of U.S. patent application Ser. No. 11/035,604, filed Jan. 14, 2005.

FIELD OF INVENTION

The invention relates to a machine that is used to trim stock sizes of venetian type blinds to fit an opening whose dimensions are provided by a customer.

BACKGROUND OF THE INVENTION

Many home centers and other retailers of window covering products purchase venetian blinds in stock sizes from a blind manufacturer and display those blinds in retail store locations. These retailers have machines, called cut-down machines, which a salesperson or technician can use to trim a stock blind to fit a window, door or other opening having dimensions smaller than the dimensions of a stock blind. Typically, the customer provides these dimensions. For example, a customer may tell a salesperson that the dimensions of the window to be covered by, the blind are 34 inches wide and 48 inches tall. The stock blind closest to those dimensions is 36 inches wide and 48 inches in length. Consequently, it will be necessary to cut two inches from the width of the stock blind to create a blind that will fit the customer's window. Because the customer usually wants each of the two ladders in a venetian blind of this size to be the same distance from the edge of the blind nearest the ladder, the retailer will cut away an equal amount of material from each edge of the blind rather than cut all the material from one edge of the blind. In the example, one inch would be cut from each edge of the blind. If the blind is too long for the opening, extra slats or other window covering material can be removed from the bottom of the blind. A cut-down machine is not used for this purpose.

There are several types of window covering work piece trimming machines known in the art. One type of machine, disclosed in U.S. Pat. No. 6,615,698 to Chuang et al., has a pair of trimming units, which are adapted from conventional power miter saws. The blind, shade, valance, shutter, headrail, bottom rail, slats, or other window covering work piece to be cut down is placed upon a work surface so that each side of the work piece is fitted through a trimming unit similar to a miter box. An adjustable end stop is provided near each trimming unit to enable the work piece to be positioned in the trimming unit so that the correct amount of material is trimmed from the work piece. The end stops are manually moved by the operator using a rule or scale provided near the end stop. Consequently, an operator of the machine must calculate the amount of material to be removed from each side or end of a stock work piece and then manually position each end stop so that the correct amount of material is cut away.

Another type of blind cutting machine has a cutting mechanism that can cut only one end of a blind. In this type of machine the operator uses the same cutting mechanism to cut one end or side of the blind then repositions the blind and cuts the opposite end of the blind. Most of these machines have a set of cutting dies that act as the cutting mechanism. These machines also have a manually adjustable end stop, which is used to position blind relative to the cutting mechanism so that the proper amount of material is cut away from the blind. The operator of these machines must calculate the amount of material to be trimmed from each side or end of the blind and then use a ruler or scale to position the stop so that the correct amount of material is removed. Examples of this type of machine can be found in U.S. Pat. No. 5,799,557 to Wang and U.S. Pat. Nos. 5,806,394 and 6,196,099 to Marocco.

One major manufacturer provides a mathematical wheel to dial in the width measurements and type of mount. After the variables have been entered the wheel will tell the sales associate the distance at which to set the end stop. Another blind manufacturer provides a modified tape measure on the machine. A piece of plastic is attached to the middle of each blind. That plastic piece is used to align the middle of the blind with a tape measure on the cutting surface.

Whenever an operator must make calculations and set end stops the possibility for errors exists. But, a more significant shortcoming of the blind trimming machines having manually adjustable stops is the time that an operator spends in positioning the end stop. It may take as much as 5 to 10 minutes for a sales associate to complete the entire cutting process. Consequently, there is a need for a blind trimming machine that automatically calculates the amount of material that should be trimmed from a work piece and then automatically positions the end stops, a window covering work piece or both so that the correct amount of material is cut away.

SUMMARY OF THE INVENTION

We provide a cutting machine for trimming window covering work pieces of the type having a first end and a second end wherein at least one of a desired amount of material adjacent the first end of the work piece and a desired amount of material adjacent the second end of the work piece is to be cut away. The cutting machine includes a stand, one or more cutting mechanisms adjacent the stand, a controller and at least one locator connected to the controller that is sized and configured to engage at least a portion of the window covering work piece at a location between the first end and second end of the work piece and is moveable relative to the at least one cutting mechanism. The controller has a memory. The memory contains a program such that the controller causes the one or more locators to move so the desired amount of material can be trimmed from the first end of the work piece or the second end of the work piece after the controller receives information about the window covering work piece.

The information about the window covering work piece can include dimensions of a window or door over which the window covering work piece will be mounted, dimensions of the work piece to be cut, the desired dimensions of the work piece to be cut, bar code information assigned to the work piece or the type of mount (e.g. inside mount or outside mount) the window covering work piece will have.

The cutting machine may further include one or more data entry devices connected to the controller. In some embodiments, the one or more data entry devices may be a keypad, a scanner, a bar code reader, or any combination thereof.

At least one display can be connected to the controller. In one embodiment, the display may be configured to provide output from the controller that provides prompts or instructions to an operator. The one or more displays may also be configured to identify information the controller receives from a data entry device.

In some embodiments, the one or more locators can include at least one moveable work surface connected to the controller so the one or more moveable work surfaces are moveable relative to the one or more cutting mechanisms. The locators may also include at least one holding device attached to the one or more work surfaces. The holding devices may be attached such that the holding devices are affixed to the work surface or are removable from the work surface. The holding devices may be sized and configured to retain the window covering work piece about to be cut. The holding devices may be one or more clips, clamps or other connectors.

In other embodiments, the one or more locators may include at least one arm connected to the controller. The one or more arms may have one or more holding devices that are sized and configured to retain a window covering work piece. In some embodiments, the holding devices may be clips, clamps, slings, claws or other connectors. The holding devices may be connected to the arm or arms such that the holding devices may move relative to an arm to which it is connected or affixed to the arm or is connected such that the holding device is removable from the arm.

Embodiments of our cutting machine may have the one or more locators configured to move adjacent the top surface of the stand. The locators may move directly on the top surface or along sidewalls or rails attached to the surface such that the locators move above the top surface without directly contacting the top surface.

In one embodiment, the one or more cutting mechanisms include at least one cutting mechanism adjacent one side of the stand and at least one cutting mechanism adjacent another side of the stand. We prefer to provide at least one cutting mechanism on opposite sides of the stand.

One or more actuators may be connected to the locators. The controllers may be connected to the actuators such that the controller causes the one or more locators to move by causing the actuators to move the locators.

Some embodiments of our cutting machine may include one or more end stops located adjacent at least one of the cutting mechanisms. The end stops may be attached to the controller to move relative to the one or more cutting machines after the controller receives information about the window covering work piece about to be cut by the cutting machine. The end stop may alternatively be configured to be moved manually by an operator or be located such that the end stop is not moveable from its position adjacent the one or more cutting machines. In one embodiment, each end stop is located adjacent a respective cutting mechanism.

Our cutting machine may also include one or more markers that identify where to position at least a portion of the window covering work piece on the one or more locators, a desired amount about to be cut from an end of the work piece, or a dimension the work piece will be after being cut down by the cutting machine. The markers may be configured to move relative to the one or more cutting mechanisms. In some embodiments, the one or more markers may be located on a locator such that the markers move when the locators move.

It should be understood that the controller may be connected to the one or more locators in numerous ways. For example, the controller may be connected to one or more locators by a wireless connection, one or more direct connections such as electrical wiring, or by connecting the controller to an actuator that is configured to move one or more locators.

In some embodiments, the one or more cutting mechanisms are positioned adjacent the stand and are supported by supports that are separate from the stand. In other embodiments, the one or more cutting mechanisms are connected to the stand.

Our cutting machine may also include one or more sensors positioned adjacent at least one of the stand, the one or more locators and the cutting mechanism. The one or more sensors may be connected to the controller to provide information relating to the work piece about to be cut by the cutting machine. In one embodiment, the one or more sensors are configured to interact with a device attached to or otherwise included in the work piece that is configured to identify information about the work piece. Such information may include the dimensions of the work piece or the work piece type, i.e., headrail, bottom rail, valance, louver, or shade. In some embodiments, the one or more sensors may be moveable relative to the cutting mechanism.

Other objects and advantages of the present invention will become apparent from a description of certain present preferred embodiments thereof shown in the drawings.

DESCRIPTION OF THE PRESENT PREFERRED EMBODIMENTS

Figure 1:
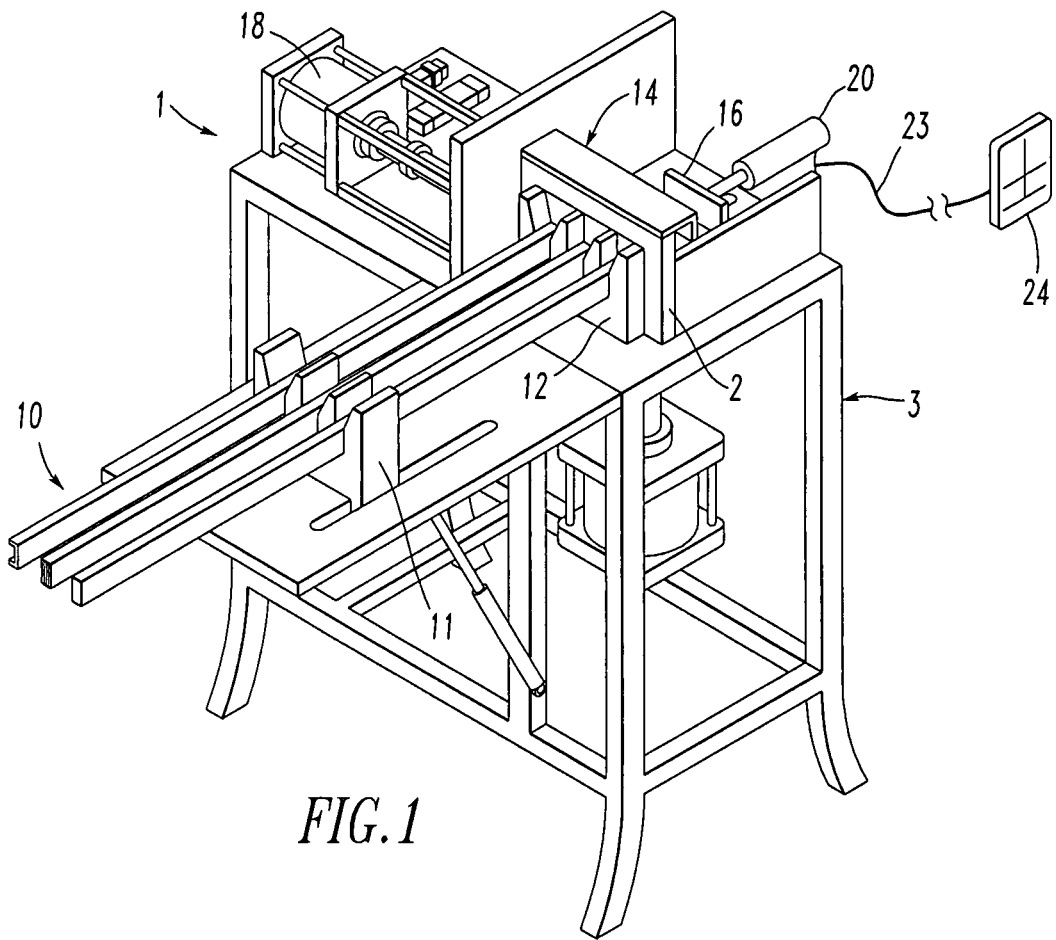
FIG. 1 is a perspective view of a first present preferred embodiment of our blind cutting machine.
Figure 2:
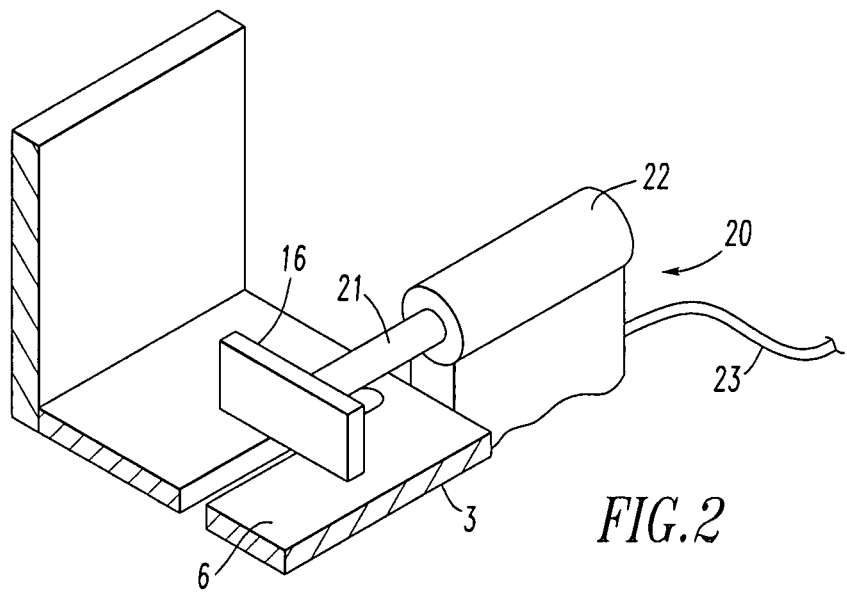
FIG. 2 is a perspective view of the portion of the cutting machine shown in FIG. 1 where the end stop is located.
Figure 3:
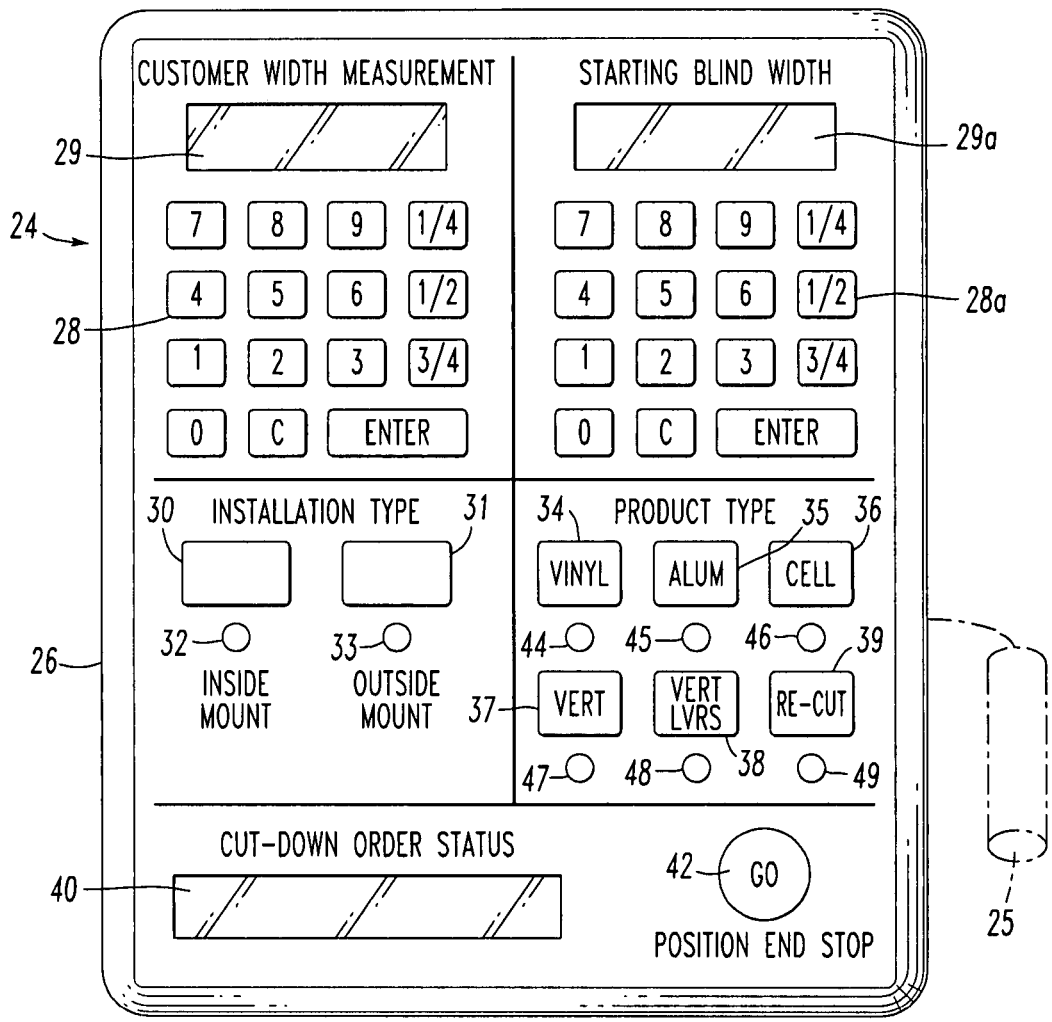
FIG. 3 is a top plan view of a present preferred controller used in the embodiment of FIGS. 1 and 2.
Figure 4:
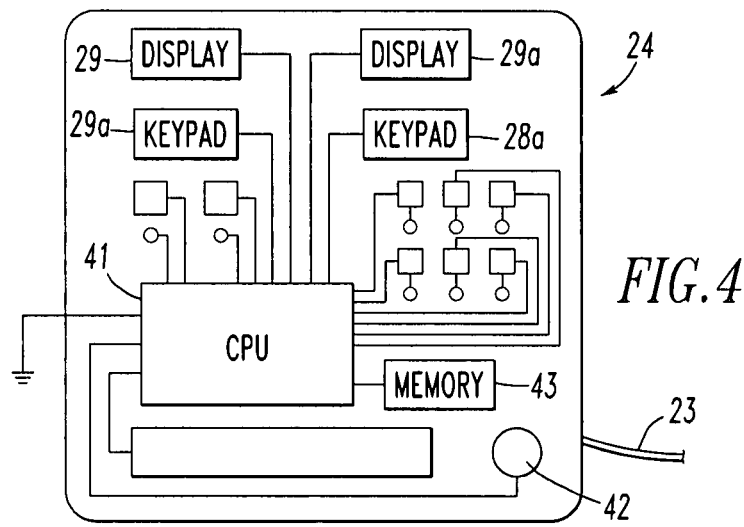
FIG. 4 is a diagram of the basic components of the controller.

A first present preferred embodiment of our cutting machine 1 shown in FIG. 1 has a stand 3 that holds the cutting mechanism 2, which trims the end of the blind. A work surface 6 extends from the stand and is used to hold a venetian blind 10 to be trimmed. A first blind holder 11 is placed adjacent the cutting mechanism and a second blind holder 12 is on the work surface 6. The blind is positioned to extend through the cutting dies 14 and abut an end stop 16. So that the end stop 16 can be seen in FIG. 1, the blind is not shown as abutting the end stop. When the blind is properly positioned an electric actuator 18 is activated to move the cutting dies to trim the blind. A preferred construction of the cutting dies and detailed discussion of the operation of the cutting mechanism illustrated in FIG. 1 can be found in U.S. Pat. No. 5,699,557, the content of which is incorporated herein by reference. An actuator 20 is attached to the stand 3 and has a plunger 21 that is attached to end stop 16. The actuator moves the end stop relative to the work surface 6 and cutting mechanism 2. The actuator could be a servomotor, a pneumatic cylinder or hydraulic cylinder. In the embodiment shown in FIGS. 1 and 2, the actuator is a hydraulic cylinder having a plunger 21 that moves out of and into the cylinder 22. The distal end of the plunger 21 is attached to the end stop. The hydraulic cylinder is connected to a controller 24 by cable 23. The controller may be mounted on the stand 3, but preferably is removable from the stand. If desired a transmitter/receiver (not shown) could be used in place of the cable 23. The controller, shown in detail in FIGS. 3 and 4, has a housing 26 that contains a processing unit 41 and memory 43. Two keypads 28, 28a are provided on the top of the housing. The keypads are used to enter information or data relating to the stock blind to be trimmed and the dimensions of the window, door or other opening to be covered by the blind to be trimmed. If desired a bar code reader 25 (shown in dotted line in FIG. 3) may be provided to read information from the container of the stock blind or a label on the stock blind to be trimmed. Although a single keypad could be used to enter all necessary information, we prefer to provide two keypads. One keypad 28 is used to enter customer width measurements and the second keypad 28a is used to enter information about the stock blind. As the data is entered, each number appears on the liquid crystal display 29 or 29a above the keypad on which the data was entered. Window blinds may be sized to fit within the perimeter of the window frame or to extend beyond the perimeter of the window frame. When a blind is mounted to fit within the perimeter of the window frame, the industry calls the attachment an inside mount. A blind that extends beyond the perimeter of the window frame and is attached to or adjacent the window frame is called an outside mount. As can be seen in FIG. 3 we prefer to provide buttons 30, 31 which allow the operator to select an inside mount or an outside mount. When button 30 is pressed an LED 32 adjacent the button illuminates. When button 31 is pressed, LED 33 adjacent button 32 illuminates. We also prefer to provide buttons 34 through 39 and adjacent LED's 44 through 49 to enable the operator to select the type of window covering product to be trimmed. The choices are a vinyl venetian blind indicated by the word VINYL on button 34, an aluminum venetian blind, indicated by the letters ALUM on button 35, a cellular shade indicated by CELL on button 36, a vertical blind indicated by VERT on button 37, and one or more louvers from a vertical blind, indicated by VERT LVRS on button 38. These buttons are required because the blind width measurement listed on the box will be one half inch greater than the actual width of an aluminum blind or cellular shade, but the same as the actual width of a vinyl blind, and the same as the actual length of a vertical blind or vertical louvers. A re-cut of a window covering is indicated by RE-CUT on button 39. A re-cut occurs when at least one end of the blind has been mis-cut and must be trimmed again. Typically, the end stop would be positioned in the same location relative to the cutting mechanism for a re-cut. Whenever one of buttons 34 through 39 is pressed the LED adjacent that button 44, 45, 46, 47, 48 or 49 is illuminated. If desired a dial or selector switches could be used to enter the data that identifies the installation type and product type.

After the operator has entered the customer width measurement and the stock blind or starting blind width, selected an inside mount or an outside mount and selected the product type, the operator presses the GO button 42. The processor 41 then computes the amount of material that must be removed from each end or side of the blind and activates the actuator 20 to position the end stop so that the correct amount of material is cut away. The programs for making the calculations and prompting the actuator are in a memory 43 inside the controller. The memory may also contain a look-up table containing product identifiers and a blind width associated with each product identifier for certain stock blinds. Then the operator need only enter the product identifier, such as a bar code, for the starting blind.

Embodiments of the program may be configured so the cutting machine is limited to only cut window covering product available at in a particular retail environment. For retailers that offer a limited selection of product, such a controller can reduce the time necessary to train users and also reduce user error.

A RECALL button may also be included on a key pad. The RECALL button is configured so that pressing the RECALL button results in the same input being sent to the controller as the input that was entered the last time the cutting machine trimmed a window covering work piece.

A HEIGHT button can also be included on the key pad. The HEIGHT button is pressed by an operator when the operator wants the cutting machine to trim the height of a window covering work piece, such as vertical blind slats. The controller is configured to calculate the amount to be trimmed from a work piece to cut the work piece down to a desired height based on information received from an operator, one or more data entry devices, or one or more sensors.

We prefer to provide a message display 40 on the top of the controller. The message display may contain instructions to guide the operator through the data entry process. In the event that the operator enters a starting blind width or height, which is the same as the customer width or height measurement, a message will appear on display 40 telling the operator that the blind does not need to be trimmed. Should the operator enter a starting blind width or height that is less than the customer width or height measurement an error message will appear in message display 40. After the operator enters a starting blind width or height that is greater than the customer width or height measurement and selects a product type and inside mount or outside mount the display 40 will notify the operator when the end stop is in position to make the cut.

If desired, another light emitting diode (not shown) could be provided on the controller housing that illuminates when the end stop is in position to make the cut. The controller 24 may also contain a bell, tone generator, buzzer or other device that produces an audible sound when a data entry error has occurred or when the end stop is in position for a cut to be made. The controller is connected to a power source. If the cutting mechanism utilizes electrical power the same power source could be used for the controller, actuator and cutting mechanism. If the cutting mechanism is manually operated, one or more batteries may provide power for the controller and actuator.

After the end stop is in position the operator places one end of the blind against the end stop and operates the cutting mechanism. Then he or she may remove the excess material from the machine and places the opposite end against the end stop. Now the opposite end of the blind can be trimmed to complete the process.

Preferably, the controller is configured for attachment to panel overlays that are easily replaced by maintenance personnel or operators. Multiple panel overlays may be provided such that changes from English units to metric units or product additions or deletions may be reflected in new panel overlays. After a unit change or product change occurs at a retail environment, the retailer may be provided with new overlays that can be easily installed to help reduce user error associated with operating our cutting machine.

Overlays may also be provided for use in connection with diagnostic programs used by maintenance personnel to identify or troubleshoot problems that could arise with the controller or cutting machine. When such diagnostic programs are to be run, personnel may change the panel overlay on the controller accordingly.

Figure 5:
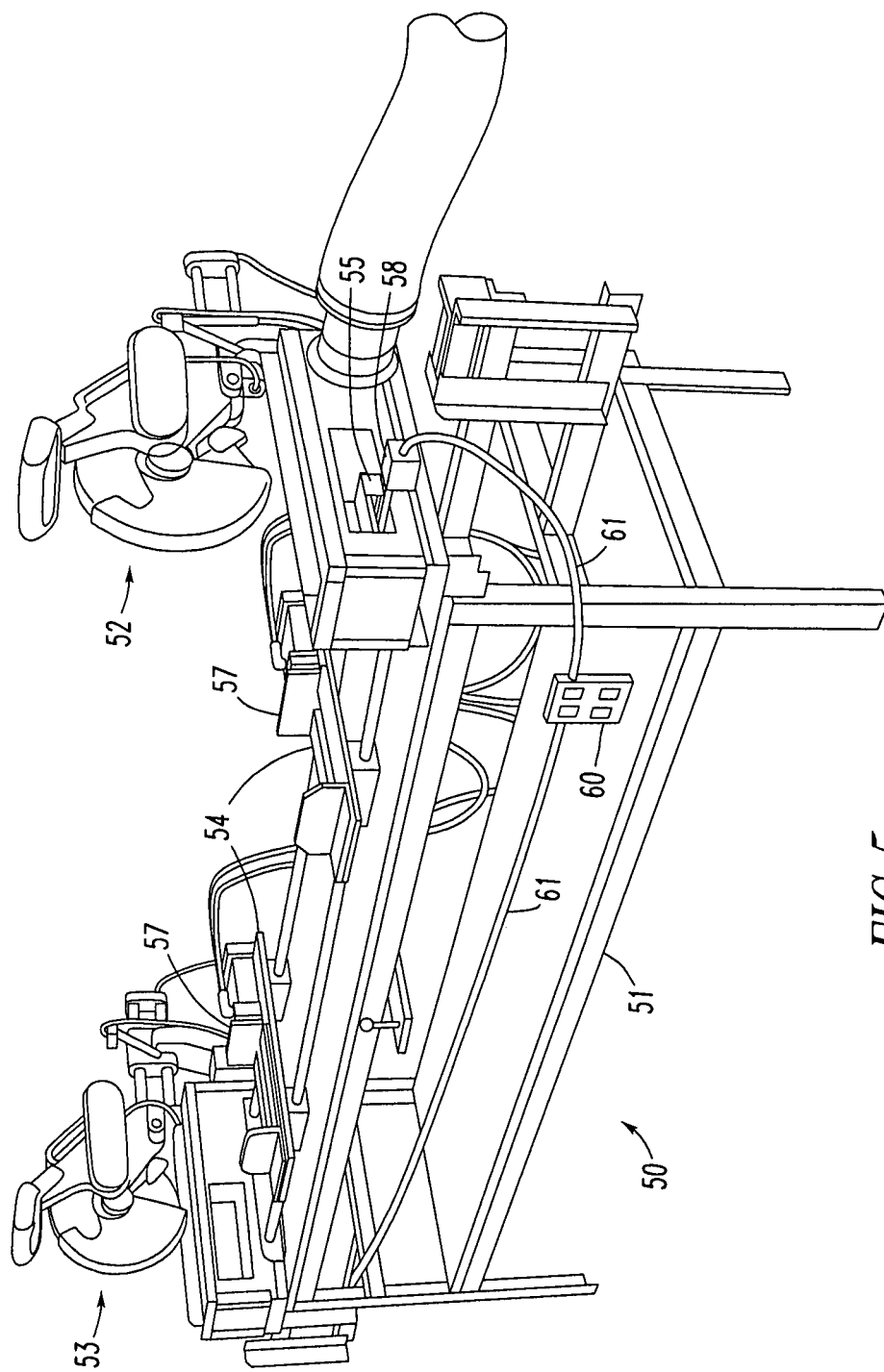
FIG. 5 is a perspective view of a second present preferred embodiment of our cutting machine.

A second present preferred cutting machine 50 shown in FIG. 5 has a stand 51 and two cutting mechanisms 52 and 53, each of which cuts only one end or side of the blind 10 to be trimmed. This cutting machine is similar to the dual-end blind trimming machine disclosed in U.S. Pat. No. 6,615,698, the content of which is incorporated herein by reference. The blind is placed on work surfaces 54 between end stops 55 and guide 57. An actuator 58 is attached to each end stop 55 and each actuator is connected to the controller 60 by a cable 61. The end stops are movable relative to the work surface and the cutting mechanisms. Only one actuator and end stop can be seen in FIG. 5. The second end stop and actuator are behind the second cutting mechanism 53 and are identical to those that can be seen in the drawing. After the customer width measurement, starting blind width, installation type and product type are entered, the controller sends a signal to each actuator which causes each actuator to move the associated end stop to a position where the cutting mechanisms will remove the proper amount of material from each end or side of the blind. The controller in this embodiment is similar to the controller of the embodiment of FIGS. 1 through 4, but operates two actuators and associated end stops rather than a single actuator and associated end stop.

A third present preferred embodiment can easily be understood with reference to FIG. 5. In this embodiment the end stops 55 and surfaces 54 do not move. Instead, the actuators 58 move the cutting mechanisms relative to the end stops and work surfaces. To operate this embodiment the blind is positioned to abut one of the end stops. Then the measurements are entered into the controller and the actuators position the cutting mechanism or cutting mechanisms so that the correct amount of material is trimmed from the blind.

Figure 6:
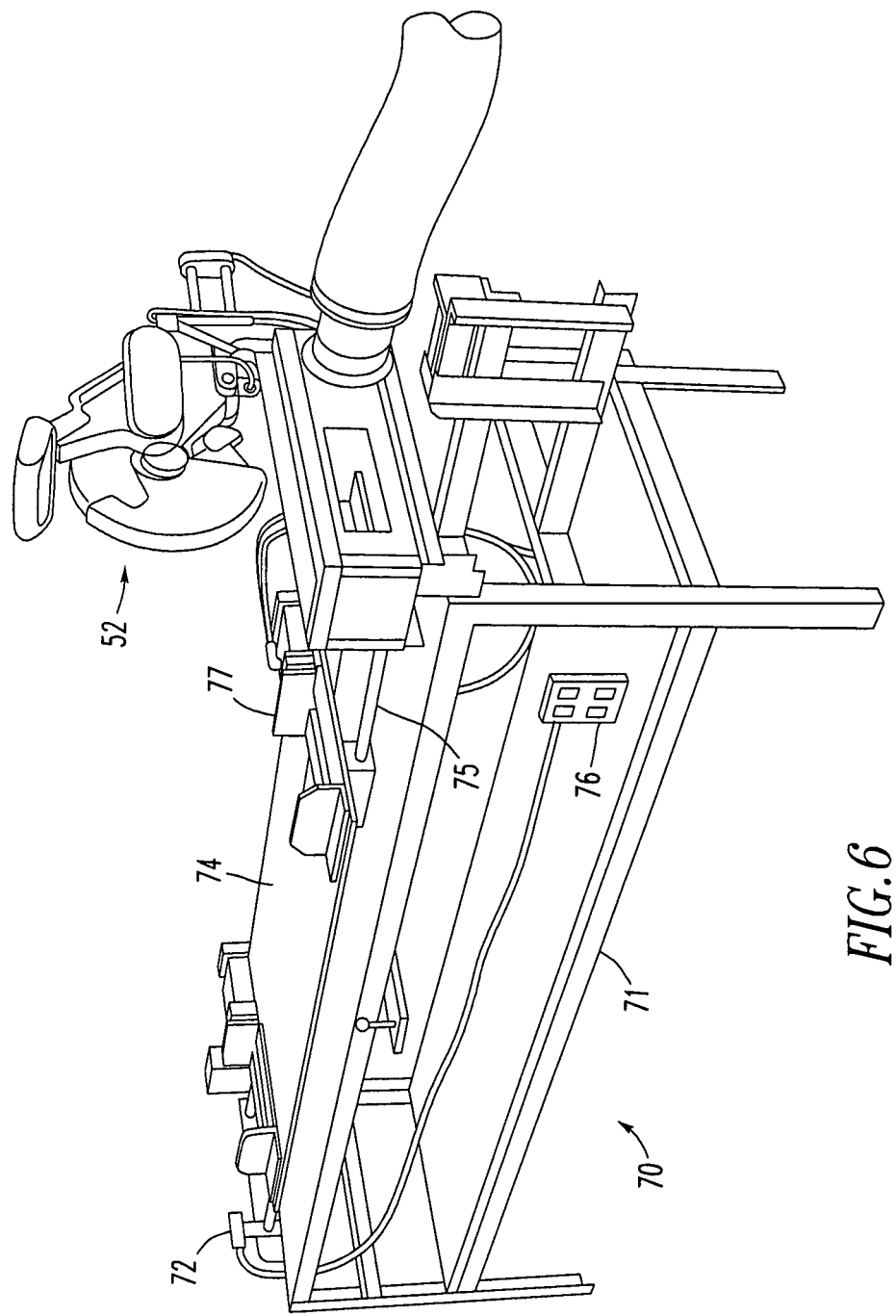
FIG. 6 is a perspective view of another present preferred embodiment of our cutting machine.

A fourth present preferred embodiment is shown in FIG. 6. In this cutting machine 70 a stand 71 has a cutting mechanism attached to one end. A locator, or moveable work surface 77, rides on rods 75. An actuator 72 is provided at the opposite end of stand 71 and is connected to work surface 74. The actuator is connected to the controller. A user places a blind to be trimmed on the movable work surface 77 aligning a portion of the blind with an edge of the work surface or a stop or other alignment structure or marking (not shown) on the work surface. Then the user enters the information into the controller 76. The controller prompts the actuator to move the moveable work surface 77 and blind on that surface relative to the cutting mechanism 52 so that the correct amount of material can be trimmed from the blind. If desired the activator may be under the work surface 74.

Figure 7:
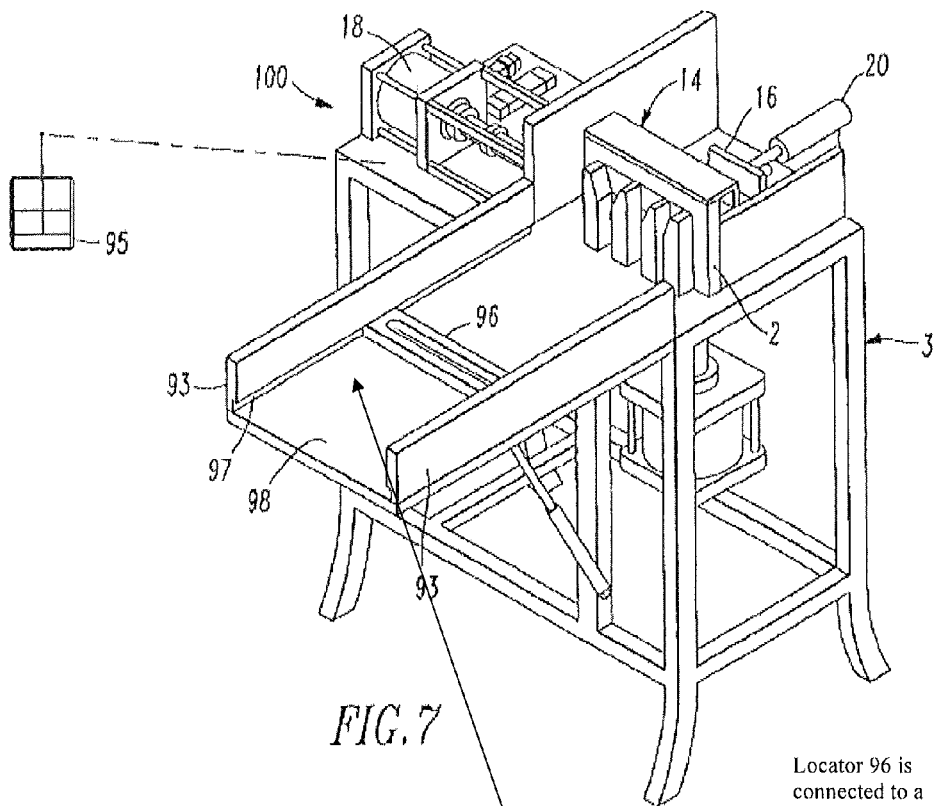
FIG. 7 is a perspective view of a fourth present preferred embodiment of our cutting machine for trimming window coverings or window covering work pieces.

Referring to FIG. 7, a fifth present preferred embodiment 100 of our cutting machine has a controller 95 connected to a locator 96 by a wireless communication device. The locator 96 is connected to sidewalls 93 that are attached to top surface 98 of the stand 3 such that the locator 96 moves adjacent the top surface 98 relative the cutting dies 14. The sidewalls 93 each have a channel 97 that receives an end of the locator 96. The locator moves along the channels 97 to move adjacent the top surface 98. Controller 95 is configured to cause the locator 96 to move along the channels 97 when the controller 95 receives information about a window covering work piece to be cut. A program within the memory of the controller causes the locator 96 to move based on information about the work piece that the controller receives from a data entry device. Such received information may include, but is not limited to, dimensions of a window or door where the window covering work piece will ultimately be positioned by a customer to cover the window or door, dimensions of the work piece to be cut, desired final dimensions of the work piece after being cut down by the cutting machine, bar code information assigned to the work piece, and whether the blind will have an inside mount or an outside mount. The locator 96 is configured to engage a portion of the window covering work piece between the ends of the work piece so that a desired amount of material adjacent one end or each end of the work piece may be cut away by the cutting dies 14.

Figure 9:
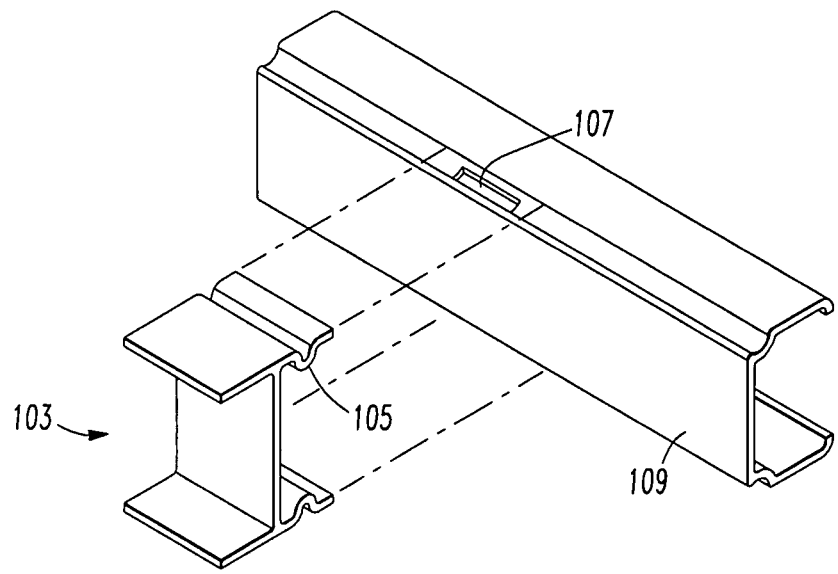
FIG. 9 is an exploded view of a first present preferred embodiment of a holding device and a headrail.
Figure 10:
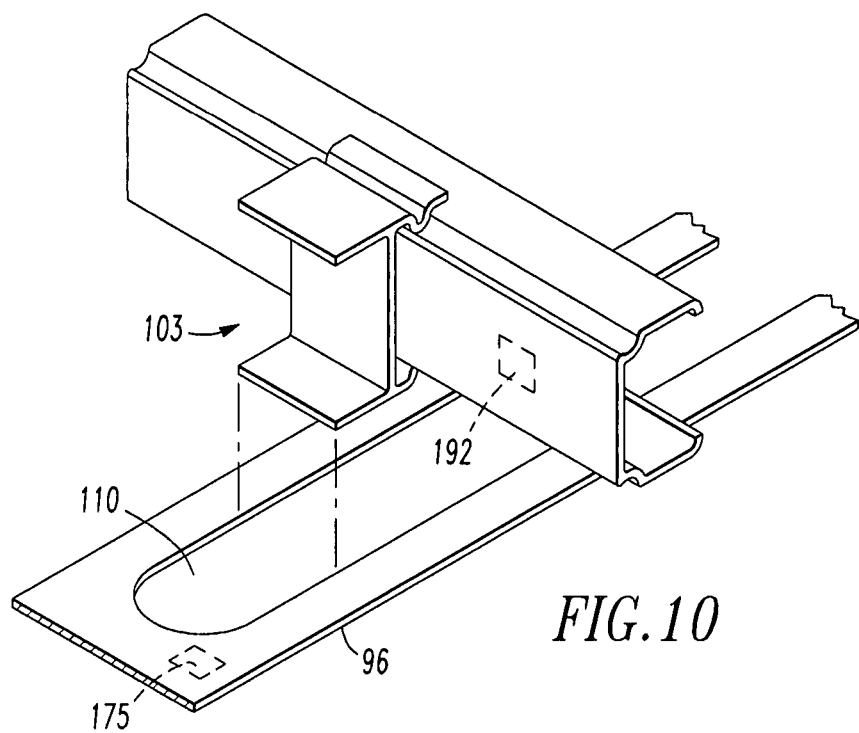
FIG. 10 is an exploded view of the first present preferred embodiment of the holding device of FIG. 9 attached to the headrail and another portion of the embodiment of the locator.

Locator 96 may be configured with one or more openings 110 that are sized to receive a clip 103, as shown in FIGS. 9 and 10. The clip 103 is sized and configured to be removably attached to a headrail 109, or other portion of a window covering work piece between the ends of the work piece. The clip 103 can be configured with an interlocking prong 105 that is sized and configured to interlock with a hole or detent 107 in the headrail or other portion of the window covering work piece, such as a bottom rail. If desired, two clips can be used, one clip attached to the headrail and the second clip attached to the bottom rail.

The clip or clips may be removed from the locator 96 to attach the clip 103 to the window covering work piece and then reattached to the locator 96 by inserting at least a portion of the clip into the opening 110. The clip 103 may be configured to interlock with or releasably connect to the locator 96 or may be configured to releasably connect to the locator by being free to move within opening 110 along at least a portion of the opening.

Hole or detent 107 on the headrail 109 or other portion of a window covering work piece may be positioned at a known location relative to the ends of the blind such that the clip engages the work piece between the ends of the work piece so that a desired amount of material adjacent each end of the work piece may be cut away from the work piece. Typically, the opening 107 will be in the center of the work piece. The controller relies upon the position of the locator relative to the ends of the work piece to position the product with respect to the cutting mechanism or cutting mechanisms.

For instance, if a work piece is a 34 inch wide blind, hole 107 can be positioned in the center of the bottom rail or headrail of the blind. If a user desires to cut the blind down to 32 inches, the controller receives the desired dimension of the blind and the current dimension of the blind through entries made on a keyboard. Then, the controller causes the locator to move to a position that will permit the cutting mechanism to cut 1 inch from one end of the blind. Then, the blind is moved to a second cutting mechanism or repositioned to cut 1 inch from the other end of the blind.

In the event the embodiment of the cutting machine has only one cutting mechanism, the operator may then remove the clips 103 and blind from the locator, rotate the blind so that the other end of the blind extends into the cutting mechanism to be cut down by 1 inch, and reconnect the clips 103 and blind to the locator so the cutting mechanism can cut the uncut end of the blind. Of course, for embodiments of the cutting machine that have two cutting mechanisms located at different sides of the stand 3, the controller can alternatively be configured to cause the locator to position the blind after the first end has been cut down by 1 inch so that the other end of the blind can be cut down by 1 inch by the other cutting mechanism. Once both ends of the blind have been cut by 1 inch, the blind will have been trimmed to the desired width.

Figure 11:
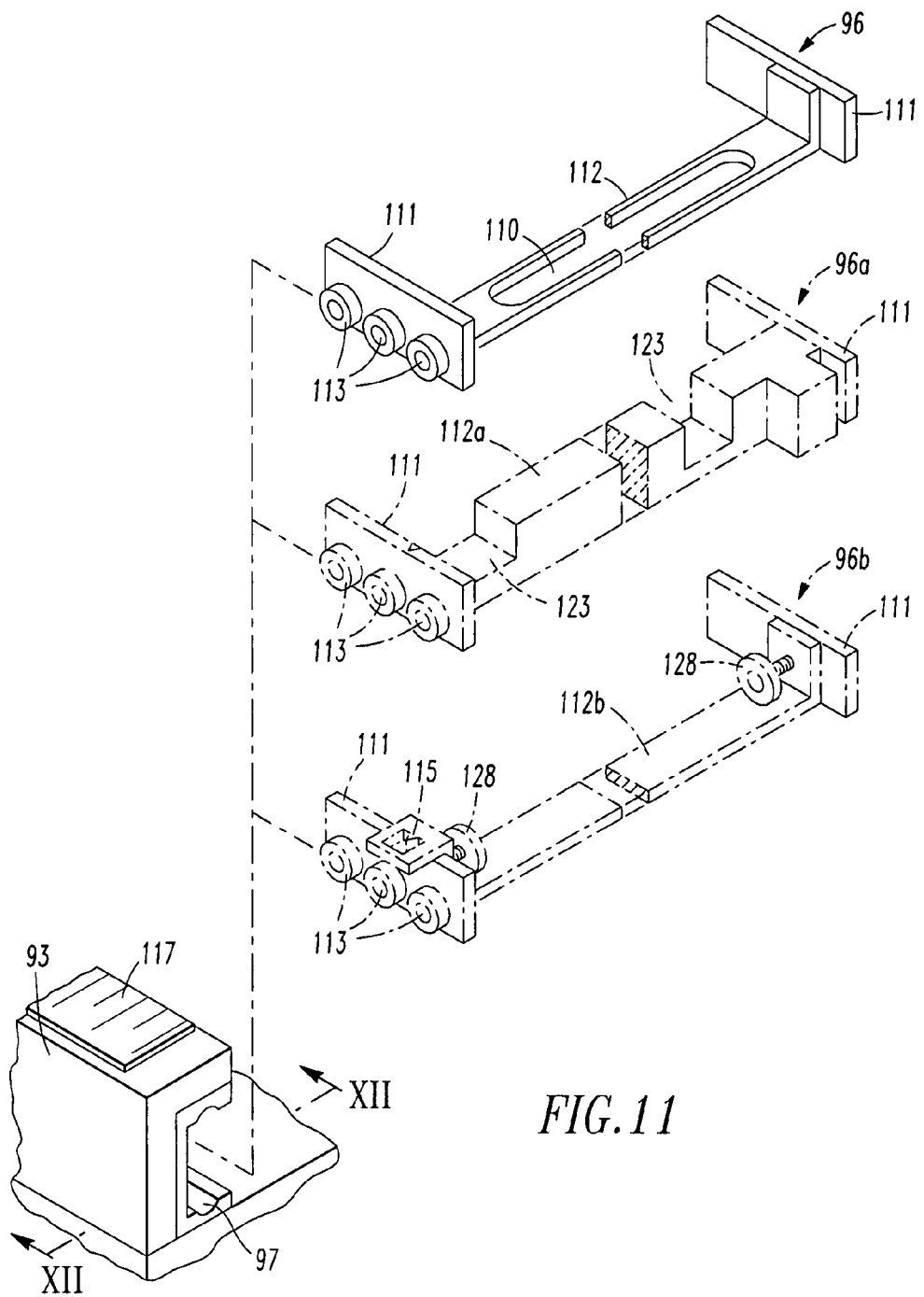
FIG. 11 is an exploded view of a present preferred locator embodiment and two alternate configurations of that locator shown in dotted line that may be connected to a portion of a first present preferred embodiment of a stand.
Figure 12:
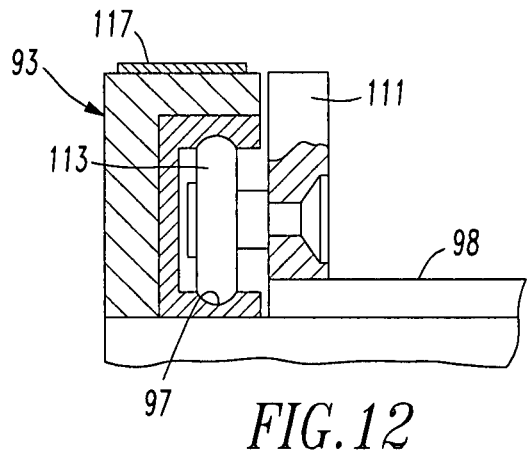
FIG. 12 is a cross sectional view taken along line XII-XII in FIG. 11 of one embodiment of a locator connected to the fifth present preferred embodiment of the cutting machine.

As may best be seen in FIGS. 11 and 12, the locators 96 may have wheels 113 attached to ends 111 of the locator that are sized and configured to fit within channel 97 of the sidewalls 93 so the locator can move adjacent the top surface 98 relative to the cutting dies 14. The body 112 of the locator may be configured to have a slot 110 that receives a clip or clips as previously described. Alternatively, the body 112a may have recesses 123 sized to hold, retain or support portions of certain window covering work pieces, such as shades, blinds, headrails or bottom rails, between the ends of the work piece.

Another option is to provide a locator 96b that has clamps 128 configured to engage a work piece on opposite sides of the body 112b at a location between the ends of the work piece. The locator may have a marker 115 attached to an end 111 that is configured to identify where a particular portion of a window covering work piece should be positioned on the locator. Marker 115 is attached to end 111 such that marker 115 moves with the locator 96b. Marker 115 can have indicia indicating where a portion of a work piece should be placed or connected to locator 96b.

Figure 8:
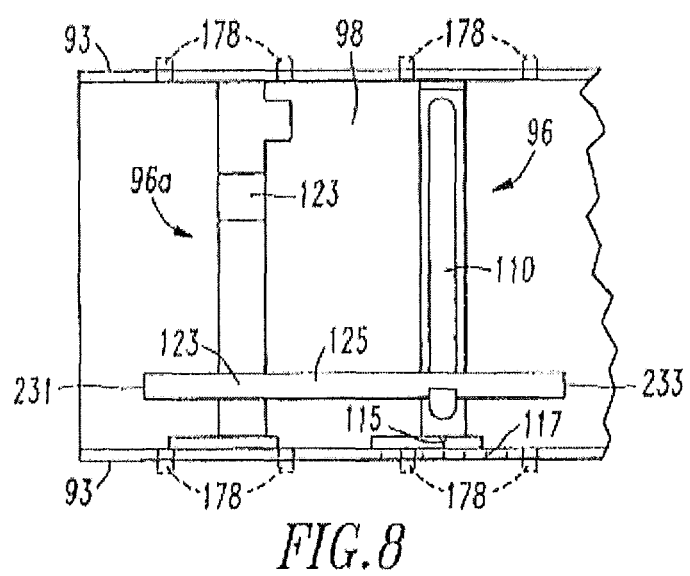
FIG. 8 is a fragmentary top view of a fifth present preferred embodiment of our cutting machine.

As shown in FIG. 8, marker 115 and lines or other indicia 117 on or adjacent a sidewall 93 can be used to identify where a window covering work piece should be positioned. For example, the indicia may indicate distances from the cutting mechanism or starting position where blinds of different widths or valances of different dimensions are to be placed.

It should be appreciated that marker 115 and indicia 117 can be used to help an operator verify the cutting machine is working properly and that a data entry error has not occurred. For example, in one embodiment, indicia 117 can be a measuring stick identifying distances in metric or English units. An operator may use the indicia to verify that a data entry error has not occurred by verifying the marker 115 identifies the appropriate indicia after a locator has moved in response to information the controller receives from input provided by the operator.

In some embodiments, the marker 115 may be a sensor 175, which is shown in dotted line in FIG. 10, attached to a locator. The sensor is preferably positioned at a location aligned with the center of a work piece. The controller can be configured to identify the position of the sensor. For example, the controller may include a receiver that receives signals transmitted by the sensor that identifies the position of the sensor. The controller can also be configured to cause the locator to move to position the locator based on the location of the sensor and input provided by an operator.

The sensor 175 could alternatively be configured to read information, or output, transmitted by a device 192, or otherwise interact with a device 192, which is shown in dotted line in FIG. 10, attached to the work piece. The device 192 may provide output configured to be read by the sensor 175. The output could identify the work piece type, such as headrail, bottom rail, valance, louver, or shade, or the dimensions of the work piece. The sensor could read the device's output and relay that information to the controller so the controller can determine the amount of the work piece to cut or where to move locators to position the work piece so the work piece is cut down to a desired dimension.

In other embodiments, multiple sensors could be positioned adjacent the stand, a locator or a cutting die. For example, multiple sensors 178 could be aligned along the sidewalls 93 that are configured to identify where a portion of a work piece is positioned on the stand in relation to a cutting mechanism, as shown in dotted line in FIG. 8. The sensors could be selectively activated by the controller so the selected sensor or sensors send output to the controller that identifies when a work piece is positioned properly. In an alternative embodiment, the activated sensors may be configured to stop a locator moving a work piece once the work piece has been identified by the sensor as being properly positioned.

Of course, the activated sensor or sensors could alternatively provide input to the controller so the controller can calculate the amount of the work piece to be cut by the cutting mechanism. For example, one or more sensors could be configured to identify the size of the work piece positioned on the stand and relay that information to the controller. Then the controller can calculate the amount of the work piece to be cut and where to position the work piece such that the desired amount of material adjacent one or both ends of the work piece can be cut away to trim the work piece to a desired dimension.

Referring to FIG. 8, locators 96 and 96a can be connected to controller 95 and configured to move adjacent top surface 98 of the stand 3. The locator 96 holds a portion of a window covering work piece 125 between the ends 231 and 233 of the work piece. A desired amount of material is cut away from the work piece adjacent one or both ends 231 and 233 of the work piece 125 by the cutting mechanism.

The work piece 125 is engaged by clip 103 which fits into locator 96 and is also held within a recess 123 of locator 96a to help stabilize a free portion of the work piece between the ends 231 and 233 of the work piece. Retention of the work piece in recess 123 can also help prevent the work piece from sliding along opening 110 of locator 96 when a desired amount of material is cut away from the work piece.

Figure 14:
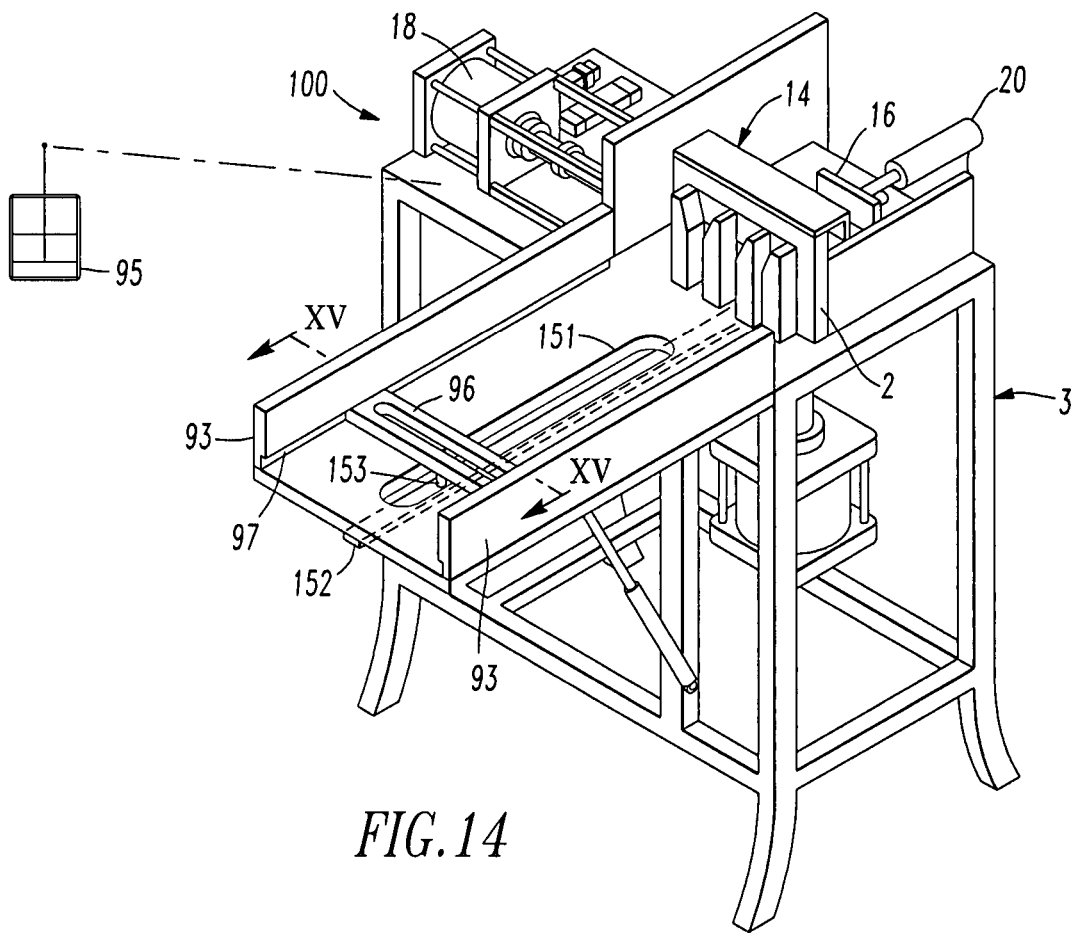
FIG. 14 is a perspective view of a seventh present preferred embodiment of our cutting machine.
Figure 15:
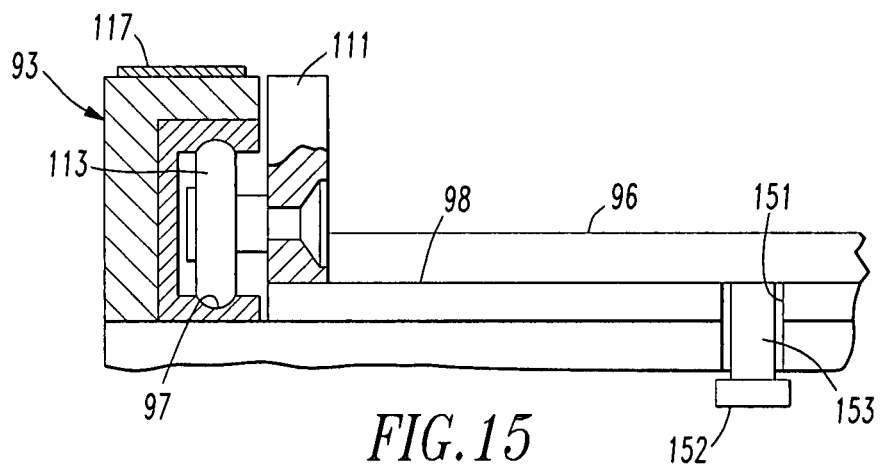
FIG. 15 is a cross sectional view taken along line XV-XV in FIG. 14 illustrating an embodiment of a locator connected to an actuator configured to move the locator.

In some embodiments, the controller 95 may cause the locator 96 to move by causing an actuator 152 to move the locator relative to the cutting dies 14, as shown in FIGS. 14 and 15. The actuator 152 may be a drive belt, drive cable, drive chain or drive rod that is positioned under the support surface 98. A slot 151 may be formed within the surface 98 such that one or more connectors 153 extend from the locator 96 to the drive device 152 to connect the locator to the actuator 152. The controller 95 can be configured to activate the actuator 152 to cause the actuator to move the locator 96 to the appropriate position relative the cutting dies 14 to ensure the correct amount of a work piece is trimmed by the dies 14.

Figure 13:
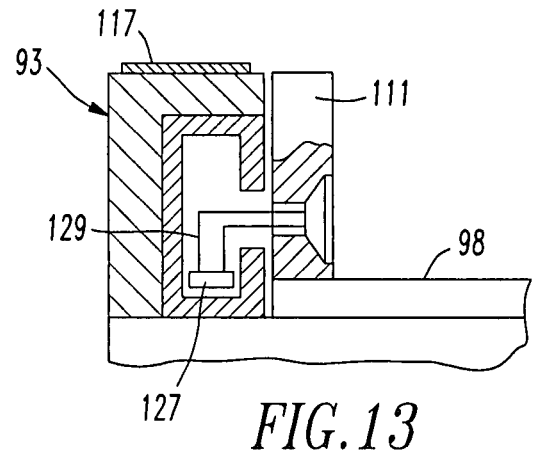
FIG. 13 is a cross sectional view similar to FIG. 12 of another embodiment of a locator connected to a sixth present preferred embodiment of the cutting machine.

In other embodiments, the actuator 152 may be in, on or adjacent the side of the surface 98. For example, the locator may have an actuator that drives the wheels 113 to move the locator along channels 97 based on information received from the controller 95. In other embodiments, the locator 96 may have projections or brackets 129 or other connector devices that connect to drive belts 127 located at least partially within recesses 97, as shown in FIG. 13.

Figure 16:
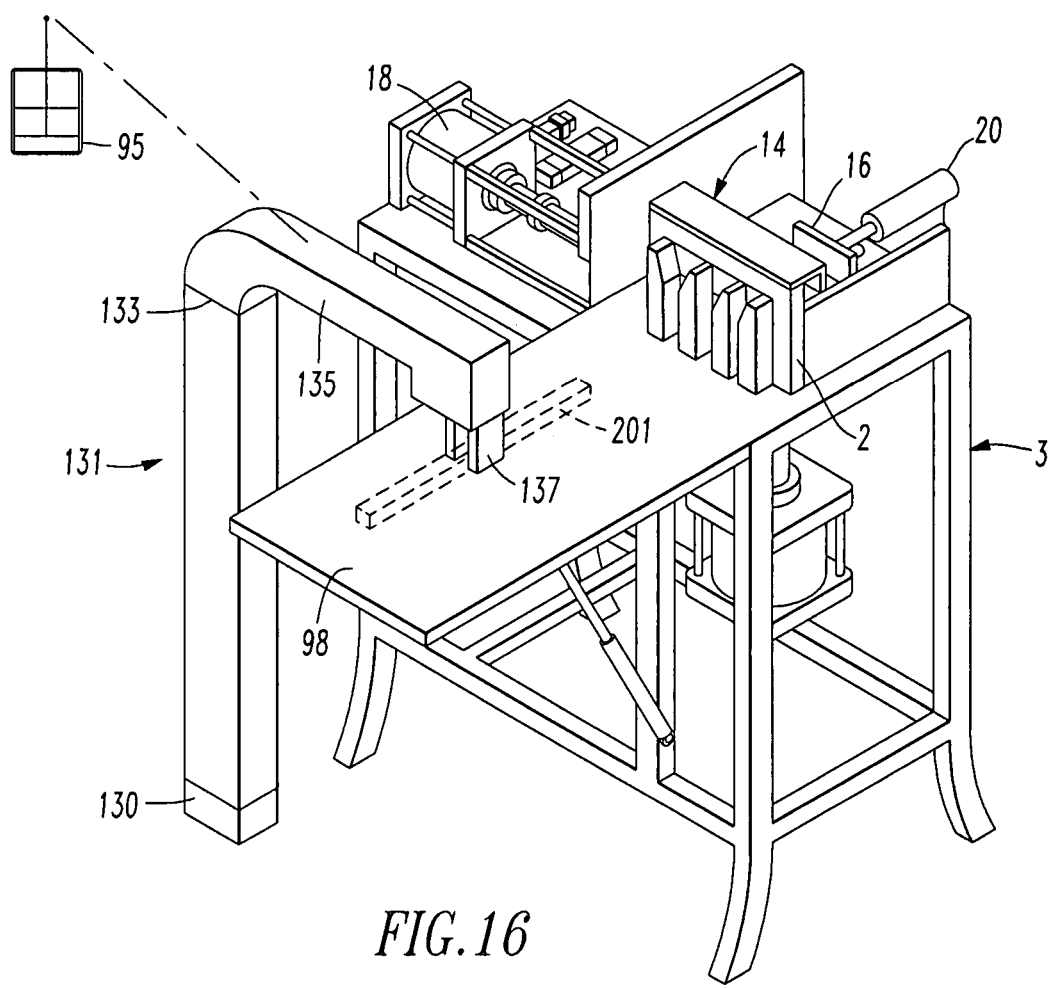
FIG. 16 is a perspective view of a seventh present preferred embodiment of our cutting machine for trimming window coverings or window covering work pieces.

Referring to FIG. 16, an arm assembly 131 can be positioned adjacent stand 3 that is connected to controller 95. The arm assembly has a base 130 and an arm 135 that is rotatably connected to the base at pivotal connection 133. The arm 135 has a holding device 137 that is configured to releasably retain a window covering work piece. The holding device has claws that are biased to a closed position, but can be moved to an open position to permit an operator to insert a work piece about to be cut within the claws. The controller can cause the arm 135 to move relative to the cutting dies 14 so that a desired amount of material adjacent an end of the window covering work piece can be cut away from the work piece based on information received by the controller 95 about the work piece. It should be understood that the arm 135 may have multiple rotatable portions to permit the arm to move the work piece relative to the cutting dies 14 while maintaining the work piece in alignment with at least one of the cutting dies 14. In some embodiments, the holding device 137 may be configured to releasably connect to arm 135 so that different holding devices may be sized and configured to hold and position different types of window covering work pieces. In other embodiments, one holding device may be used to hold different types of window covering work pieces.

Figure 17:
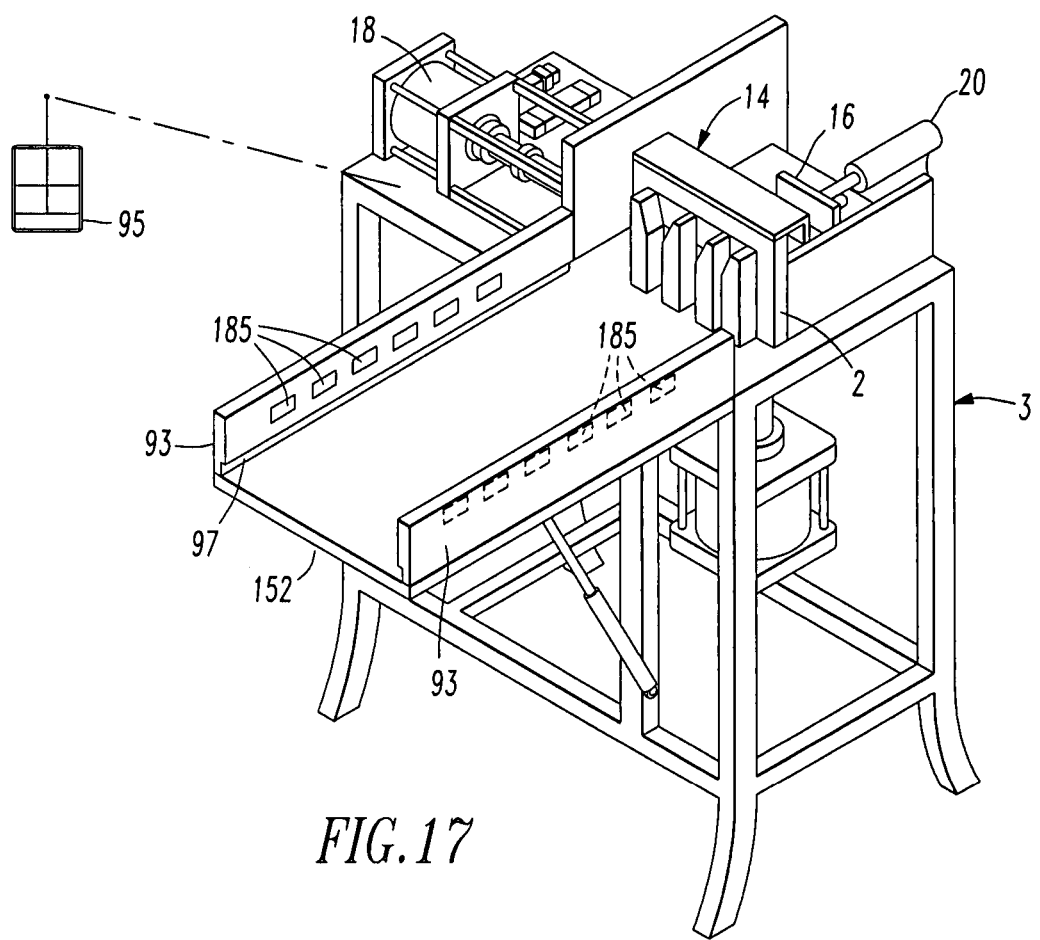
FIG. 17 is a perspective view of an eighth present preferred embodiment of our cutting machine for trimming window coverings or window covering work pieces with the magnets attached to at least one of the sidewalls.

Referring to FIG. 17, one or more magnets 185 can be configured to move work pieces adjacent the support surface 98. Based upon the strength of the one or more magnets, the controller may selectively activate and deactivate selective magnets 185 in series to engage at least one portion of the work piece between the ends of the work piece to move the work pieces adjacent the support surface to a desired location.

In another embodiment, the one or more magnets are positioned adjacent the support surface 98 and are configured to move adjacent at least a portion of the stand to cause the work piece to move to a desired location. For example, the one or more magnets may form at least a portion of a moveable work surface 74 or be moveably positioned underneath the support surface 98. As another example, one or more magnets 201, as shown in dotted line in FIG. 16, may be connected to an arm 135 that is moveable adjacent the support surface 98 and be configured to move a work piece on the support surface 98. Of course, the one or more magnets can be configured to move adjacent the work surface to move the work piece in various different ways. For example, one or more magnets may be attached to one or more drive belts, pistons, pneumatic cylinders, servomotors, hydraulic cylinders or other movement mechanisms. In the event a work piece is not affected by magnetic fields, clips or other connectors can be attached to the work piece that are configured to allow the magnets to engage the work piece between the ends of the work piece to move the work piece.

It should be understood that a magnet may engage a work piece when the magnetic field of the magnet acts on or affects the work piece. The magnetic field may be strong enough to cause the work piece to directly contact a magnet. However, the work piece may be engaged by the magnet without directly touching the work piece. For example, a magnet that is moveably positioned under the support surface 98 to move a work piece engages the work piece though the magnet does not physically touch the work piece.

The embodiments here disclosed automatically calculate the amount to be trimmed and then position one or more end stops, one or more locators, or both locators and end stops relative to the cutting mechanism so that the desired amount of material is cut away. As a result the trimming process will be faster and less prone to error than the trimming processes followed with the blind cutting machines of the prior art.

Although the cutting mechanisms in the preferred embodiments are motorized this is not required. For example, one could substitute the manual cutting mechanism disclosed in U.S. Pat. No. 5,333,365 to Marocco et al. for the cutting mechanism in the embodiments of FIGS. 1 through 5.

While we have illustrated embodiments of our cutting machine holding a headrail about to be trimmed, it should be understood that embodiments of our cutting machine may be configured to cut numerous different window covering work pieces and is not limited to only cutting headrails or only cutting one type of window covering work piece.

Although we have described and illustrated certain present preferred embodiments of our blind trimming machine and methods of trimming blinds, the invention is not limited thereto and may be variously embodied within the scope of the following claims.

We claim:

1. A cutting machine for trimming window covering work pieces of the type having a first end and a second end, wherein at least one of a desired amount of material adjacent the first end of the work piece and a desired amount of material adjacent the second end of the work piece is to be cut away, comprising:
   a stand;
   at least one cutting mechanism adjacent the stand;
   a controller, the controller having a memory;
   at least one locator connected to the controller, the at least one locator sized and configured to engage at least a portion of the window covering work piece at a location between the first end and the second end of the work piece, the at least one locator being movable relative to the at least one cutting mechanism; and
   the memory containing a program such that the controller causes the at least one locator to move so the at least one of the desired amount of material adjacent the first end of the work piece and the desired amount of material adjacent the second end of the work piece can be cut after the controller receives information about the window covering work piece; and
   wherein the information about the window covering work piece comprises a dimension of a window or door over which the window covering work piece is to be mounted, a dimension of the work piece to be cut, a desired dimension of the work piece to be cut, and whether the work piece will have an inside mount or an outside mount.

2. The cutting machine of claim 1 wherein the information about the window covering work piece further comprises bar code information assigned to the work piece.

3. The cutting machine of claim 1 further comprising at least one data entry device connected to the controller.

4. The cutting machine of claim 3 wherein the at least one data entry device is comprised of at least one of a keypad, a scanner and a bar code reader.

5. The cutting machine of claim 1 further comprising at least one display connected to the controller.

6. The cutting machine of claim 1 wherein the at least one locator comprises at least one moveable work surface connected to the controller so the at least one moveable work surface is moveable relative to the at least one cutting mechanism.

7. The cutting machine of claim 6 further comprising at least one holding device attached to the at least one moveable work surface, the at least one holding device sized and configured to retain the window covering work piece.

8. The cutting machine of claim 7 wherein the at least one holding device comprises at least one clip or clamp.

9. The cutting machine of claim 1 wherein the at least one locator comprises at least one holding device sized and configured to retain the window covering work piece.

10. The cutting machine of claim 9 wherein the at least one holding device is at least one clip or clamp.

11. The cutting machine of claim 1 wherein the at least one locator comprises at least one arm connected to the controller.

12. The cutting machine of claim 11 wherein at least one holding device is connected to the at least one arm, the at least one holding device sized and configured to retain the window covering work piece.

13. The cutting machine of claim 1 wherein the stand has a top surface and the at least one locator is configured to move adjacent the top surface of the stand.

14. The cutting machine of claim 1 wherein the controller is connected to the at least one locator by at least one wireless connection.

15. The cutting machine of claim 1 wherein the at least one cutting mechanism comprises a plurality of cutting mechanisms, at least one cutting mechanism adjacent to a first side of the stand and at least one cutting mechanism adjacent to a second side of the stand.

16. The cutting machine of claim 15 wherein the first side of the stand is opposite the second side of the stand.

17. The cutting machine of claim 1 wherein the at least one locator is comprised of at least one actuator connected to the controller.

18. The cutting machine of claim 1 further comprising at least one end stop located adjacent the at least one cutting mechanism.

19. The cutting machine of claim 18 wherein the at least one end stop is also connected to the controller such that the controller causes the at least one end stop to move relative the at least one cutting machine after the controller receives information about the window covering work piece.

20. The cutting machine of claim 1 further comprising at least one marker, the at least one marker identifying at least one of where to position at least a portion of the window covering work piece on the at least one locator, a desired amount of material be cut from an end of the work piece, and a size the work piece will be after being cut down by the cutting machine.

21. The cutting machine of claim 20 wherein the at least one marker is moveable relative to the at least one cutting machine.

22. The cutting machine of claim 1 wherein the at least one cutting mechanism is connected to the stand.

23. The cutting machine of claim 1 further comprising at least one sensor adjacent at least one of the cutting mechanism, the at least one locator and the stand.

24. The cutting machine of claim 23 wherein the at least one sensor is moveable relative to the cutting mechanism.

25. The cutting machine of claim 23 wherein the at least one sensor is connected to the controller and configured to interact with a work piece that comprises a device configured to identify information about the work piece.

26. A cutting machine for trimming window covering work pieces of the type having a first end and a second end, wherein at least one of a desired amount of material adjacent the first end of the work piece and a desired amount of material adjacent the second end of the work piece is to be cut away, comprising:
   a stand;
   at least one cutting mechanism adjacent the stand;
   a controller, the controller having a memory;
   at least one locator connected to the controller, the at least one locator sized and configured to engage at least a portion of the window covering work piece at a location between the first end and the second end of the work piece, the at least one locator being movable relative to the at least one cutting mechanism;
   at least one sensor adjacent at least one of the cutting mechanism, the at least one locator and the stand; and
   wherein the memory contains a program such that the controller causes the at least one locator to move so the at least one of the desired amount of material adjacent the first end of the work piece and the desired amount of material adjacent the second end of the work piece can be cut after the controller receives information about the window covering work piece; and
   wherein the at least one sensor is moveable relative to the cutting mechanism.

27. A cutting machine for trimming window covering work pieces of the type having a first end and a second end, wherein at least one of a desired amount of material adjacent the first end of the work piece and a desired amount of material adjacent the second end of the work piece is to be cut away, comprising:
   a stand;
   at least one cutting mechanism adjacent the stand;
   a controller, the controller having a memory;
   at least one locator connected to the controller, the at least one locator sized and configured to engage at least a portion of the window covering work piece at a location between the first end and the second end of the work piece, the at least one locator being movable relative to the at least one cutting mechanism;
   at least one sensor adjacent at least one of the cutting mechanism, the at least one locator and the stand; and
   wherein the memory contains a program such that the controller causes the at least one locator to move so the at least one of the desired amount of material adjacent the first end of the work piece and the desired amount of material adjacent the second end of the work piece can be cut after the controller receives information about the window covering work piece; and
   wherein the at least one sensor is connected to the controller and configured to interact with a work piece that comprises a device configured to identify information about the work piece.

* * * * *